Patented Mar. 25, 1930

1,751,690

UNITED STATES PATENT OFFICE

CHARLES R. FABEN, OF ST. LOUIS, MISSOURI, ASSIGNOR TO THE AMERICAN TAR PRODUCTS COMPANY, OF CHICAGO, ILLINOIS, A CORPORATION OF DELAWARE

WATERPROOF FIRE-RESISTANT PLASTIC COMPOSITION

No Drawing.   Application filed August 7, 1922.   Serial No. 580,337.

This invention relates generally to a new plastic composition and has for a primary object the production of a plastic composition characterized by great economy both in the process of manufacture and in the materials employed and yet which is both strong, waterproof and fire resistant. A plastic composition made in accordance with the invention is suitable for various industrial purposes. It may be used to advantage in place of cement mixtures or lime mortar in plastering the exterior or interior of structures. The composition may be applied on wood, metal, or concrete, or on such foundations as laths, wire mesh, expanded metal and the like. Again, it may be employed as a roofing applied in the same manner to walls or other surfaces, or, if desired it may be fabricated into shingles, tiles or imitation slate and employed in the same manner as these articles. The composition is also useful as a flexible wearing surface to be applied over concrete, for the purpose of preventing rapid evaporation of the water used in mixing concrete. In the moist state, the composition may be worked on a potter's wheel or used for many of the purposes for which clay alone has heretofore been used. When so used, it possesses the distinct advantage of becoming waterproof when dry, so that it is unnecessary to give the fabricated article a heat treatment, such as is done in the case of clay pottery. The composition is thus valuable for the manufacture of such articles as drain tiles, crocks, bricks of various shapes, ornamental urns and the like. The composition may also be employed in the construction and maintenance of roads as a binder and filler for stone, gravel, slag and the like, and, in this connection, has the advantage over other bituminous material that it may be applied when the road is wet or cold, without losing any of its valuable properties.

In addition to the general objects recited above, the invention has for further objects such improvements and advantages as are found to obtain in the processes and product hereinafter described or claimed.

In carrying out the invention, in a preferred exemplification thereof, a proportion of relatively hard hydrocarbons such as hard coal tar pitch or hard pitch from water gas tar, is finely powdered and mixed with dry unctuous clay also finely powdered. To this mixture, a fibrous binder is added. The binding material may be constituted of fibres of organic origin, such as hair, wool, cotton, wood pulp, jute, straw, and the like, or of inorganic origin such as asbestos, mineral wool, spun glass and the like. Water is then added to the mixture, and the mass is worked, or agitated, until a smooth paste is obtained of the desired consistency. To the paste thus obtained, a relatively soft hydrocarbon material, such as coal tar, is added and the mixing is continued until all the ingredients are uniformly distributed throughout the mass. The character of the final product may be varied by varying the proportion of any of the ingredients employed. The use of more clay and pitch in proportion to the tar and fibre will give a relatively hard and brittle final product, while if a greater proportion of tar and fibre is employed, the final product will be relatively soft and flexible. The water accomplishes the purpose of facilitating the mixing of the several ingredients and may be used in any quantity desired. The substance thus prepared is dried in any suitable manner and results in a plastic composition that is waterproof and very resistant to fire. The composition is a mixture of relatively hard hydrocarbons and relatively soft hydrocarbons, both intimately incorporated into a uniform mass by the fibrous binding material and clay, having the characteristic hardness, strength and fire resistant properties of the inorganic material such as the clay combined with the waterproofing characteristics of the organic constituents, such as the tar and the pitch.

In the mixing process, no heating is required to thoroughly incorporate the several constituents of the composition into a uniform mixture. The employment of heat is disadvantageous in the formation of hydrocarbon or bituminous mixtures, for the reason that some portions of the mixture are apt to be overheated and the desired characteristics destroyed, while other parts are left unmixed. Moreover, the viscous nature of the material requires an excessive amount of power to form a uniform mixture. By the invention the fluxing together of the several constituents is readily accomplished because of the emulsion which the clay forms with the water. With such an emulsion, and with the pitch, or relatively heavy hydrocarbons in a finally divided condition, as hereinabove stated, the abrasive action of the particles of the clay tends to reduce the size of the pitch particles, with the result that the area of the sum of the particles is increased. The tar or relatively light hydrocarbons also divides into very minute globules, so that the degree of contact is increased to such an extent that a mutual solution is effected in a reasonable length of time even at ordinary temperatures. Moreover, in the mixing process by which the emulsion is produced, the particles of clay and hydrocarbons of both degrees of hardness are so mingled that for practical purposes they are indistinguishable and the characteristics of the mixture resemble in part those of all the components. The effect of the fibrous binder is to augment the force of adhesion of the particles. By the introduction of the fibers, which are relatively long in proportion to the other particles, there is substituted the tensile strength of the fibers for the force of adhesion lost by the evaporation of the water, with the result that the mass does not tend to crack in drying, but as the mixture dries, the emulsion breaks with the formation of a very intimate uniform mixture of the materials.

An advantageous application of the above stated discovery is as follows: 500 parts by weight of dry clay, is thoroughly mixed with 333 parts by weight of powdered pitch, and 100 parts by weight of asbestos fibres. To this mixture is added 600 parts by weight of water and the mixture is worked to form a paste. To the paste is added 150 parts by weight of coal tar and after the coal tar has been thoroughly incorporated in the paste the mixture is moulded into the shape desired, or applied to the work and allowed to dry.

Instead of mere clay, other inert inorganic material capable of forming an emulsion, and preferably having some of the constituents of clay, may be employed. The clay or other material may not require to be finely powdered. In the mixture, there may also be used hard asphalt powdered, or a native bitumen such as grahamite, manjack or gilsonite, in place of hard pitch, and asphaltic petroleum or flux oil in place of coal tar.

The process and product may be variously practiced and produced within the scope of the claims hereinafter made.

I claim:

1. The herein described process of producing a waterproof, fire resistant plastic composition, which consists in mixing 500 parts by weight of dry clay with 333 parts by weight of powdered pitch and 100 parts by weight of asbestos fibers, and adding to the mixture 600 parts by weight of water which is worked into the mixture to form a paste containing an emulsion of clay and water, next adding to the mixture 150 parts by weight of coal tar and allowing the water to evaporate from the mixture; substantially as specified.

2. The herein described process of producing a waterproof, fire resistant plastic composition, which consists in mixing 500 parts by weight of dry clay with 333 parts by weight of powdered pitch and 100 parts by weight of fibrous binder, and adding to the mixture 600 parts by weight of water which is worked into the mixture to form a paste containing an emulsion of clay and water, next adding to the mixture 150 parts by weight of coal tar and allowing the water to evaporate from the mixture; substantially as specified.

3. The herein described process of producing a waterproof, fire resistant plastic composition, which consists in mixing 500 parts by weight of inert mineral filler with 333 parts by weight of powdered pitch and 100 parts by weight of fibrous binder, and adding to the mixture 600 parts by weight of water which is worked into the mixture to form a paste containing an emulsion of such inert material and water, next adding to the mixture 150 parts by weight of coal tar and allowing the water to evaporate from the mixture; substantially as specified.

4. The herein described process of producing a waterproof, fire resistant plastic composition, without the application of heat, which consists in forming a substantially dry mixture by mixing finely divided clay with powdered pitch and asbestos fibers, and adding to the substantially dry mixture water which is worked into the mixture to form a paste containing an emulsion of clay and water, next adding to the mixture coal tar and allowing the water to evaporate from the mixture; substantially as specified.

5. The herein described process of producing a waterproof, fire resistant plastic composition without the application of heat, which consists in forming a substantially dry mixture by mixing finely divided clay with powdered pitch and fibrous binder, and adding to the substantially dry mixture water which is worked into the mixture to form a paste containing an emulsion of clay and water, next adding to the mixture coal tar and allowing the water to evaporate from the mixture; substantially as specified.

6. The herein described process of producing a waterproof, fire resistant plastic composition without the application of heat, which consists in forming a substantially dry mixture by mixing finely divided inert mineral filler and with powdered pitch fibrous binder, and adding to the substantially dry mixture water which is worked into the mixture to form a paste containing an emulsion of such inert material and water, next adding to the mixture coal tar and allowing the water to evaporate from the mixture; substantially as specified.

7. The herein described process of producing a waterproof, fire resistant plastic composition, which consists in: forming a substantially dry mixture by mixing finely divided clay with a powdered hard bituminous material that is liquefiable by heat and fibrous binder, then adding to such substantially dry mixture water which is worked into the mixture to form a paste, next adding to the mixture a substantially emulsion free softer bituminous material that is liquefiable by heat, substantially as specified.

8. The herein described process of producing a waterproof, fire resistant plastic composition, which consists in: forming a substantially dry mixture by mixing finely divided protective colloid with a finely divided hard bituminous material that is liquefiable by heat, then adding to such substantially dry mixture water which is worked into the mixture to form a paste, next adding to the mixture a softer bituminous material that is liquefiable by heat, said softer material being of such nature that it will flux, or dissolve partly or wholly the hard material.

In testimony whereof I have hereunto set my hand.

CHARLES R. FABEN.